(12) United States Patent
Yamaoka et al.

(10) Patent No.: US 7,866,824 B2
(45) Date of Patent: Jan. 11, 2011

(54) SEALED LAMP DEVICE AND PROJECTOR

(75) Inventors: Kei Yamaoka, Tokyo (JP); Motohisa Haga, Kanagawa (JP); Kazuya Terasaki, Gifu (JP); Katsuhiro Yamashita, Tokyo (JP); Takashi Nasu, Tokyo (JP)

(73) Assignee: Sony Corporation (JP)

( * ) Notice: Subject to any disclaimer, the term of this patent is extended or adjusted under 35 U.S.C. 154(b) by 612 days.

(21) Appl. No.: 11/901,706

(22) Filed: Sep. 18, 2007

(65) Prior Publication Data
US 2008/0106701 A1 May 8, 2008

(30) Foreign Application Priority Data
Sep. 20, 2006 (JP) .............................. P2006-254815

(51) Int. Cl.
*G03B 21/16* (2006.01)
(52) U.S. Cl. ......................................... 353/52; 313/113
(58) Field of Classification Search ............. 353/52–61; 313/45, 113
See application file for complete search history.

(56) References Cited

U.S. PATENT DOCUMENTS 5,722,753 A * 3/1998 Okada et al. ................. 353/57
5,842,761 A * 12/1998 Futakami et al. ............ 353/57
6,398,366 B1 6/2002 Hara et al.
7,364,308 B2 * 4/2008 Murasugi ..................... 353/61
7,513,626 B2 * 4/2009 Adachi et al. ................ 353/60

FOREIGN PATENT DOCUMENTS

| JP | 2001-183746 A | 7/2001 |
|---|---|---|
| JP | 2002-075014 A | 3/2002 |
| JP | 2005-149884 A | 6/2005 |
| JP | 2006-106656 A | 4/2006 |
| JP | 2006-309096 A | 11/2006 |

* cited by examiner

*Primary Examiner*—Seung C Sohn
(74) *Attorney, Agent, or Firm*—Lerner, David, Littenberg, Krumholz & Mentlik, LLP

(57) ABSTRACT

A sealed lamp device may include a discharge lamp burner; a concave mirror opened to a front direction and reflecting radiation light of the discharge lamp burner to the opened side, an optical axis of the concave mirror being aligned with an optical axis of the discharge lamp burner; a hollow casing structure having an opening section in a front side, to which the concave mirror opened out; and a front plate closing the opening section of the hollow casing structure and emitting the radiation light. The hollow casing structure may be made wider than an opening width of the concave mirror, so as to increase a sealed volume occupied by the discharge lamp burner.

8 Claims, 5 Drawing Sheets

SEALED LAMP DEVICE AND PROJECTOR

CROSS-REFERENCE TO RELATED APPLICATIONS

This application claims priority from Japanese Patent Application No. JP 2006-254815 filed in the Japanese Patent Office on Sep. 20, 2006, the entire content of which is incorporated herein by reference.

BACKGROUND OF THE INVENTION

1. Field of the Invention

The present invention relates to a sealed lamp device such as a metal halide lamp which is one type of high voltage discharge lamps, and a projector using the same.

2. Description of Related Art

In related art, a light source unit configured by combining a concave mirror and a discharge lamp burner such as an extra-high pressure mercury lamp and a metal halide lamp is used as a lighting source for a projector.

Recently, a so-called sealed lamp device, in which a front plate made of a translucent material is placed at a front opening of the concave mirror on the light-emitting side, is typically used.

The discharge lamp burner radiates not only light but also a large amount of heat. Accordingly, longer use cause overheat of the discharge lamp burner or the vicinity thereof, and may result in burst or loss of clarity of the burner and breakage of inner surface of the concave mirror.

The sealed lamp device has advantages in preventing burst sound from leaking outside and broken pieces from dispersing outside even if the discharge lamp burner accommodated therein blows out. In addition, the sealed lamp device has advantages in preventing luminance decrease due to entering of dust or mote contained in ambient air.

However, in view of emission efficiency and life of the discharge lamp burner, temperature of the discharge lamp burner needs to be in a predetermined range. Accordingly, air cooling using a fan such as a sirocco fan or axial fan is conducted to blow air to the discharge lamp burner. A technology similar to such related art is disclosed in Japanese Patent Application Publication No. JP 2001-183746.

SUMMARY OF THE INVENTION

Luminance improvement or power increase of the discharge lamp burner is being made so as to cooperate with cases such as operation in a bright room, use of a larger screen, or spreading light to areas other than the front area for improving viewing angle. Due to these requirements for improvement of picture brightness, the luminance of the discharge lamp burner is being increased and hence amount of heat to be exhausted is also continuously increased.

In order to increase heat exhaust of the discharge lamp burner, the rotation speed of a fan may be increased, or more powerful fan blower may be used. However, as a result of the changes, a unacceptable level of air blowing noise may be generated, thereby severely damaging product value of a projector. Although there is a sealed lamp device that is provided with a circular duct line including a heat exchanger outside to improve heat radiation performance, such a structure causes an increase in the number of components and size of a projector, thereby leading to a higher cost.

Accordingly, it may be desirable to provide a sealed lamp device capable of improving heat radiation or heat exhaust performance with lower cost while being compact. The technical issues of the present invention have been set in view of the above.

According to an embodiment of the present invention, a sealed lamp device may include a discharge lamp burner and a concave mirror opened to a front direction and reflecting radiation light of the discharge lamp burner to the opened side, an optical axis of the concave mirror being aligned with an optical axis of the discharge lamp burner. The device may further include a hollow casing structure having an opening section in a front side, to which the concave mirror opened out, and a front plate closing the opening section of the hollow casing structure and emitting the radiation light. The hollow casing structure may be made wider than an opening width of the concave mirror, so as to increase a sealed volume occupied by the discharge lamp burner.

The sealed lamp device of the present embodiment may have the hollow casing structure wider than the opening section of the concave mirror, and may enlarge the sealed volume occupied by the discharge lamp burner. Accordingly, the radiation performance may be improved and temperature lowering effect may be obtained with lower cost.

In another embodiment of the present invention, a projector may include a sealed lamp device which may include a discharge lamp burner; a concave mirror opened to a front direction and reflecting radiation light of the discharge lamp burner to the opened side, an optical axis of the concave mirror being aligned with an optical axis of the discharge lamp burner; a hollow casing structure having an opening section in a front side, to which the concave mirror opened out; a front plate closing the opening section of the hollow casing structure and emitting the radiation light; and a flow-guiding plate disposed inside of the hollow casing structure and guiding vertical air convection along an entire inner wall of the hollow casing structure. The hollow casing structure may be made wider than an opening width of the concave mirror, so as to increase a sealed volume occupied by the discharge lamp burner. The projector may further include a lamp cooling device cooling the discharge lamp burner, and an optical unit including a projection lens and a reflecting mirror.

The projector may have a larger sealed volume occupied by the discharge lamp burner, and vertical air convection may flow to the entire inner wall of the hollow casing structure by the flow-guiding plate. Accordingly, the radiation performance may be improved. The projector may be made in lower cost while being a compact structure.

According to the present invention, the radiation performance of the sealed lamp device may be improved. With this improvement, temperature range of the sealed lamp device may be regulated within a predetermined temperature range, thereby improving lighting efficiency and life of the device. Further, the improvement of the radiation performance may allow use of a lower air flow of a blower fan. Accordingly, noise generated by the blower fan may be decreased considerably and saves power consumption.

The improvement of the radiation performance of the sealed lamp device may be realized with a simple compact structure at lower cost, thereby preventing a projector from being larger in size or higher cost.

DETAILED DESCRIPTION

Detailed description of an embodiment of the present invention will be made in accordance with the drawings as below.

Figure 1:
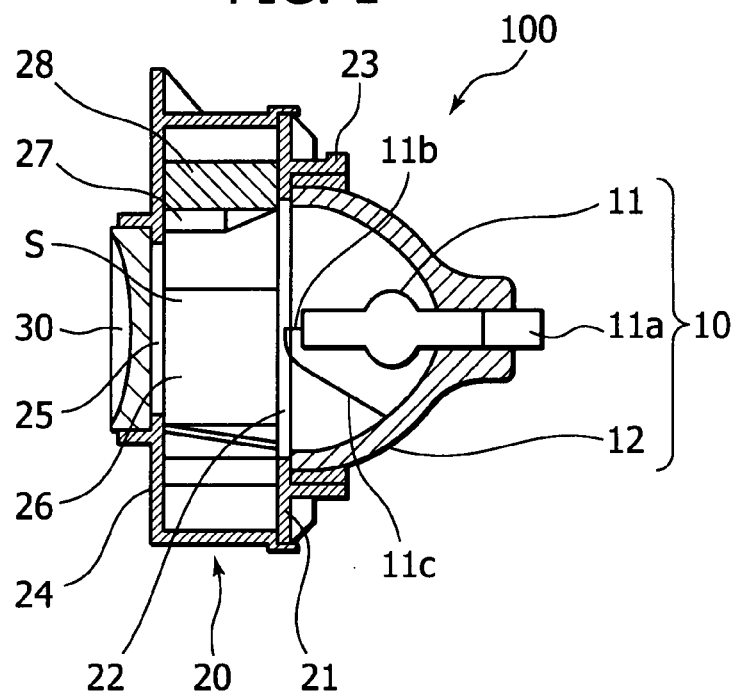
FIG. 1 is a vertical sectional view of a sealed lamp device according to an embodiment of the present invention.
Figure 2:
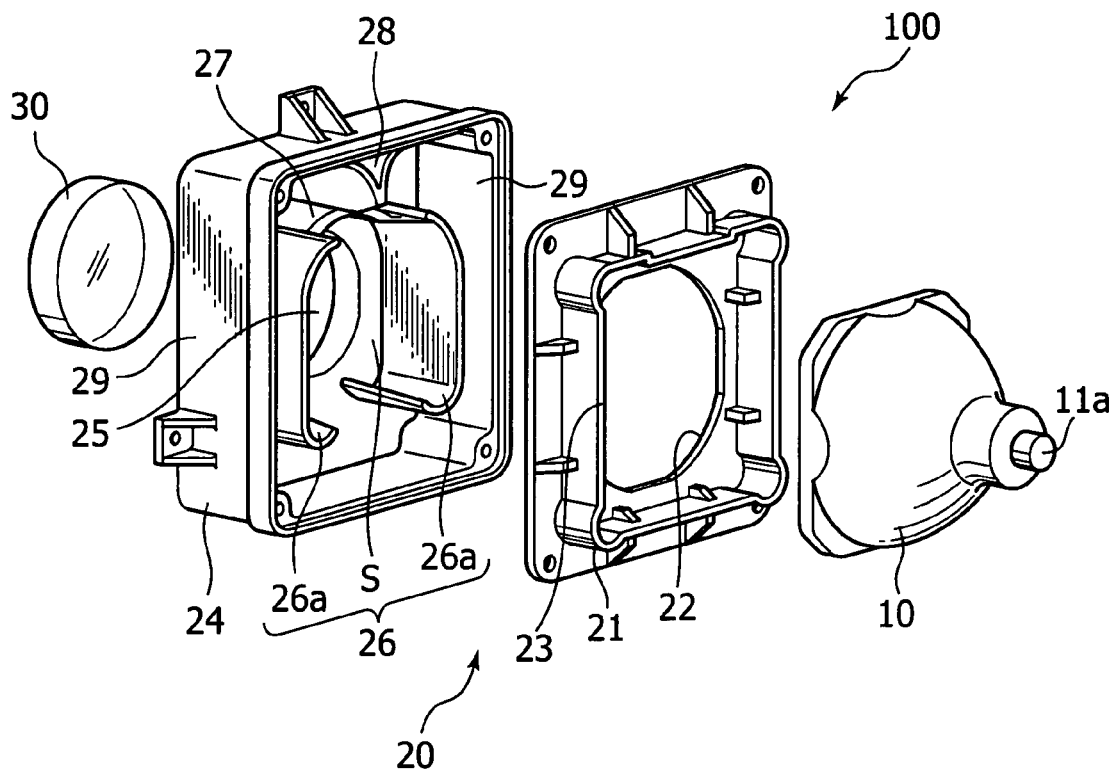
FIG. 2 is an exploded perspective view of the sealed lamp device shown in FIG. 1.

FIG. 1 is a section view showing a sealed lamp device of an embodiment of the present invention, and FIG. 2 is a exploded perspective view showing the sealed lamp device shown in FIG. 1.

In FIG. 1, a sealed lamp device 100 includes a lamp unit 10 including: a discharge lamp burner 11 as a lighting source and a concave mirror 12 which is formed in a bowl shape and reflects radiation light of the discharge lamp burner 11; a hollow casing structure 20 disposed in a front side of the concave mirror 12 and having an opening section in the front side; and a front plate 30 made of transparent material such as lens, glass and resin, closing the opening section of the hollow casing structure 20 and emitting radiation light of the discharge lamp burner 11.

The discharge lamp burner 11 uses a DC starting system and is horizontally held inside the concave reflecting mirror 12 which serves as a reflector. In other words, a holding tube portion 11a of the discharge lamp burner 1 is coaxially inserted in the horizontal direction from inside to the middle area of the bottom section of the concave mirror 12. The discharge lamp burner 11 is then fixed by electric insulating cement and projected outside.

Further, an outer lead 11b is axially inserted to a tip of the discharge lamp burner 11 and a lead 11c is connected to a tip of the outer lead 11b. The lead 11c penetrates the concave mirror 12 and is lead to the back side of the concave mirror 12. The lead 11c is connected to a starting circuit (not shown in the figure).

The concave mirror 12 opens to the front side, and the center axis or the optical axis thereof aligns with an optical axis of the discharge lamp burner 11. The radiation light of the discharge lamp burner 11 is reflected to the opened side of the concave mirror 12. The concave mirror 12 is made of, for example, silica glass or metal, and has inside thereof a reflection surface made of evaporated film with superior reflection property such as $TiO_2$—$SiO_2$.

The hollow casing structure 20 includes a square tube member 24 and an intermediate member 21. The structure 20 is formed in a box shape and is placed coaxially to the opening side of the concave mirror 12. The hollow casing structure 20 is made wider than the opening section of the concave mirror 12. The tube member 24 has a circle shaped aperture 25, in the center of the front section of which a front plate 30 is attached. The square intermediate member 21 is fixed at the rear opening section of the tube member 24.

At a center section of the intermediate member 21, a substantially circle shaped hole 22 which is substantially match to the opening of the concave mirror 12 is formed. At a rear side of the intermediate member 21, a square shaped edge part 23 surrounding the hole 22 is projected to the concave mirror 12 is formed. The opening of the concave mirror 12 and the hole 22 are coaxially attached, and the concave mirror 12 is fixed in the edge part 23, thereby forming a sealed space S from the concave mirror 12 and the hollow casing structure 20, in which the discharge lamp burner 11 is accommodated.

The hollow casing structure 20 is made of highly heat conductive material such as aluminum, copper or magnesium to effectively radiate inner heat to outside. Inner surface of the hollow casing structure 20 is subjected to anodizing treatment, coating or some chemical conversion surface treatments to prevent rust and decrease thermal reflectance ratio while increasing heat radiation ratio, thereby increasing the radiation effect.

In the tube member 24, a flow-guiding plate 26 guiding an internal vertical air convection is formed. The flow-guiding plate 26 is formed from a pair of band plates 26a which are disposed in proximity to both of right and left side walls 29 of the tube member 24 with a gap in between. Between upper parts of the pair of band plates 26a, a median plate 27 having a narrower width than that of the band plate 26a is provided so as to bridge the upper parts of the band plates 26a. A flow separating plate 28 is formed in a substantially inverted triangle shape at upper wall of the tube member 24 above the median plate 27. The flow separating plate 28 guides a upward air flow to right and left directions.

Figure 3:
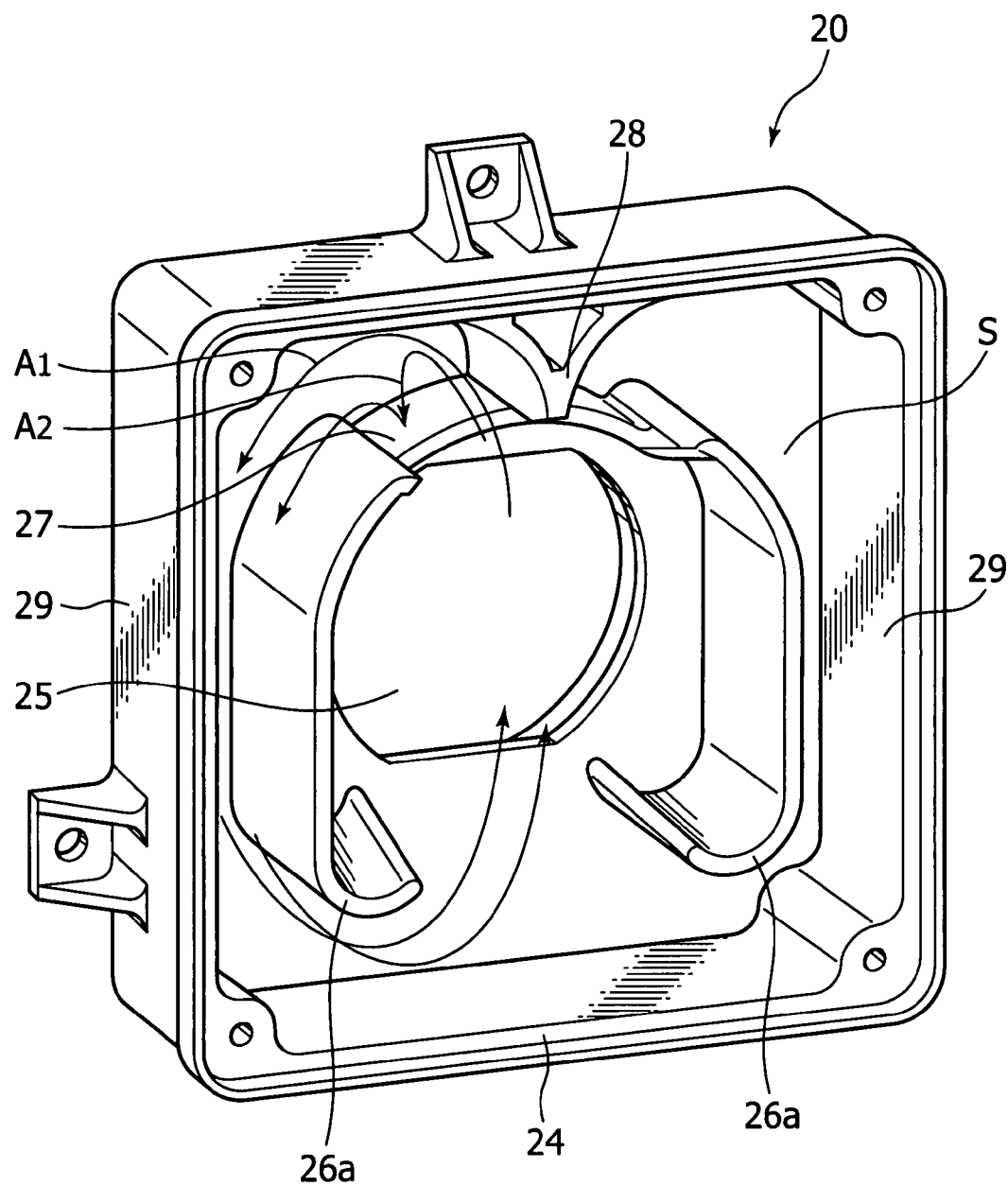
FIG. 3 is a perspective view showing air convection in a hollow casing structure shown in FIG. 1.

As shown in FIG. 3, vertical convection A1 and A2 are generated in the hollow casing structure 20 when the discharge lamp burner 11 is turned on and air is heated by radiant heat of the discharge lamp burner 11. The vertical convection A1 flows through side of the narrow median plate 27, collides with the upper wall of the hollow casing structure 20, and is lead to space between the band plate 26a and the side wall 29.

The air flow such as the vertical convection A2, which collides with the upper wall of the hollow casing structure 20 and flows down toward below a rising position, is blocked by the median plate 27 and lead to space between the band plate 26a and the side wall 29.

As described the above, the vertical convection A1 and A2 convect along the whole area of the two side walls 29 of the hollow casing structure 20 by the flow-guiding plate 26 such that the vertical convection A1 and A2 flow while contacting with a broader area of the inner wall of the hollow casing structure 20. Therefore, an effective heat exchange between air and the inner wall of the hollow casing structure 20 may be achieved. In other words, the heat radiation effect of air in the sealed area S to ambient air may be improved, thereby cooling of the lamp unit 10 may be promoted.

Figure 4:
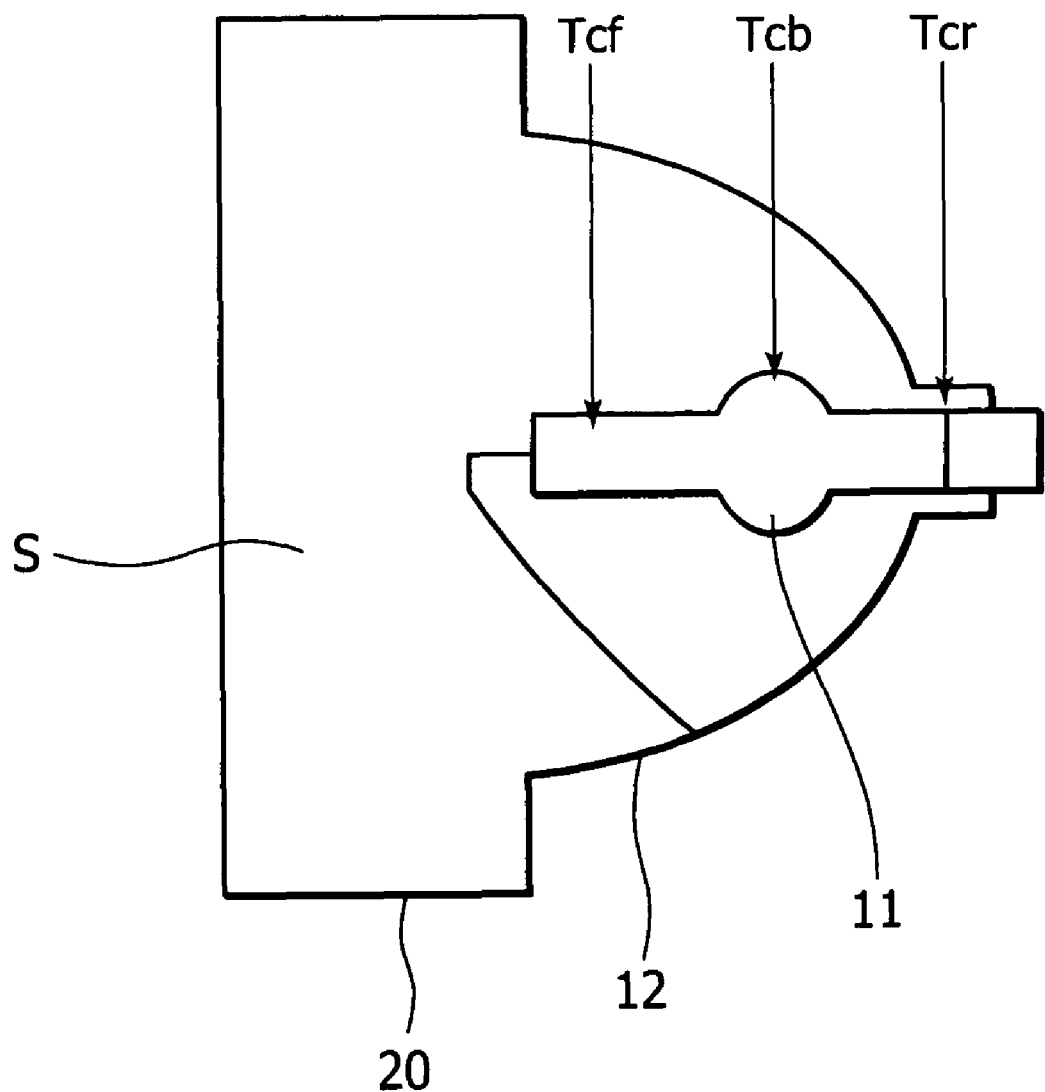
FIG. 4 is an illustration showing temperature measurement points of a discharge lamp burner.
Figure 5A:
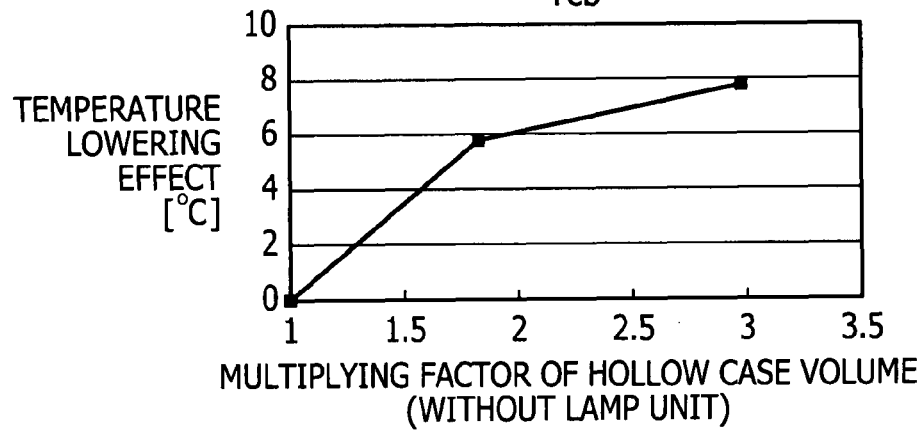
FIGS. 5A to 5C are characteristic diagrams showing relationships between a volume of hollow casing structure and temperature lowering effect in each of temperature measurement points.
Figure 5B:
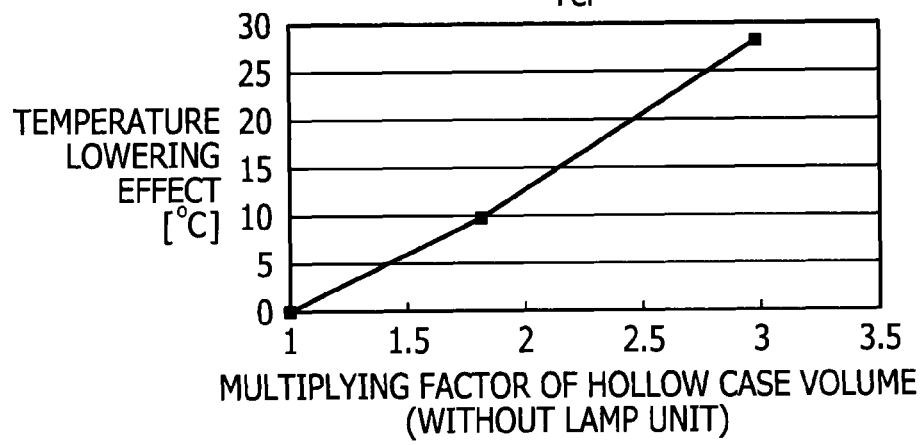
Figure 5C:
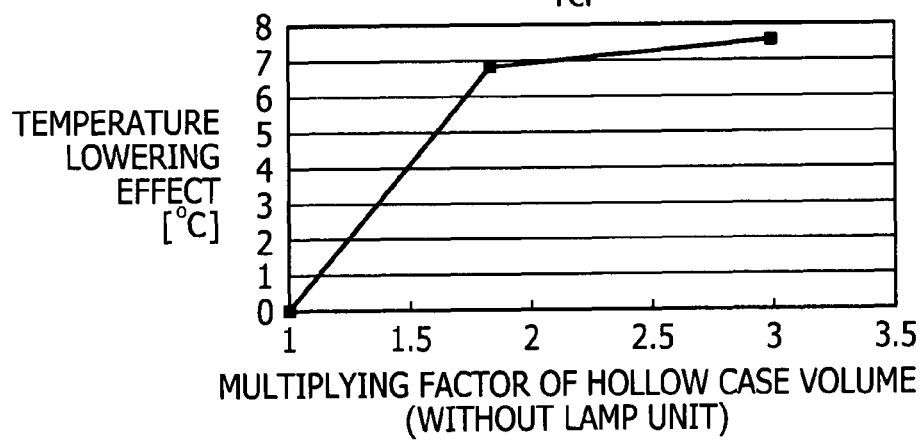

FIG. 4 shows measurement points in the sealed lamp device 100 of the present embodiment for experiments confirming the radiation performance of the discharge lamp burner 11 in cases where the sealed area S facing the discharge lamp burner 11 is enlarged by attaching the hollow casing structure 20. In the FIG. 4, Tcf denotes front part of the discharge lamp burner 11, Tcr denotes rear part of the discharge lamp burner 11, and Tcb denotes intermediate part of the discharge lamp burner 11. Temperature changes of Tcf, Tcr, and Tcb are individually measured by thermocouples. As a result of the experiment, as shown in FIG. 5, temperature lowering effect is increased at all of the parts, Tcf, Tcr and Tcb as the volume of the hollow casing structure 20.

The experimental result was obtained in the cases where the hollow casing structure 20 does not include the flow-guiding plate 26. If the sealed lamp device 100 having the flow-guiding plate 26 is used, the heat exchange ratio of the hollow casing structure 20 may be increased, and the temperature lowering effect may be further improved.

Furthermore, the hollow casing structure 20 is made of highly heat conductive material and subjected to black colored anodizing treatment or coating on the inner surface. Accordingly, the hollow casing structure 20 has lower thermal reflectance ratio, higher heat radiation ratio, ensuring an increase in the radiation effect of the hollow casing structure 20 and further improvement of temperature lowering effect.

Figure 6:
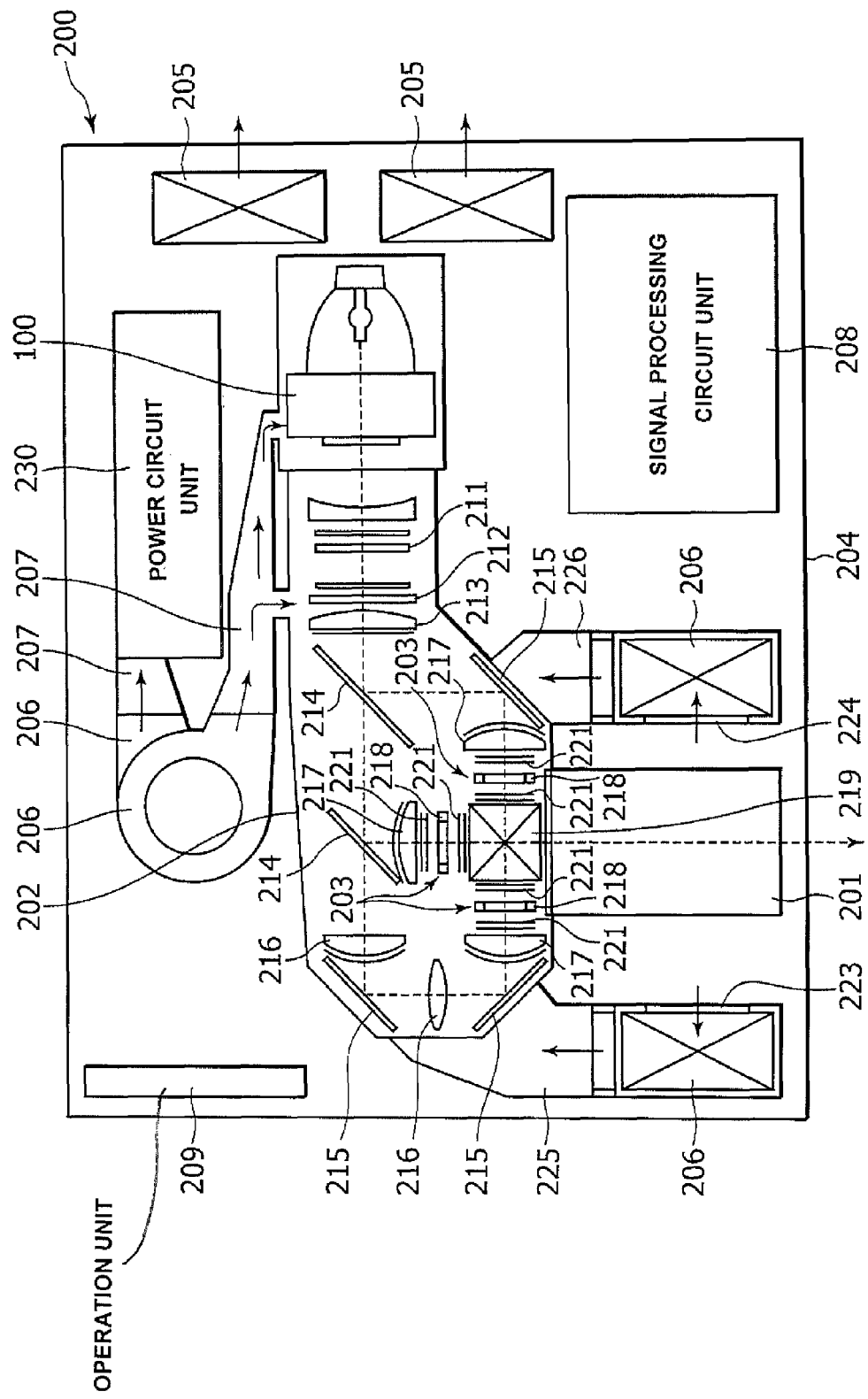
FIG. 6 is a configuration diagram showing a projector using the sealed lamp device shown in FIG. 1 as a light source.

A configuration of a projector 200 including a sealed lamp device as described in the above is shown in FIG. 6. In FIG. 6, the projector 200 has an outer cabinet 204. The outer cabinet 204 includes a sealed lamp device 100 as a light source, and an optical unit 202. Light radiated from the sealed lamp device 100 is emitted to a light valve 203 of the optical unit 202, and an image obtained therein is projected to the screen by a projection lens 201.

Inside the outer cabinet 204, there are provided a sirocco fan 206 for cooling the sealed lamp device 100 and the optical unit 202, an axial fan 205 for radiating heat of the sealed lamp device 100 and the optical unit 202, a power circuit unit 230 for supplying electricity to the sealed lamp device 100 and the like, a signal processing circuit unit 208, and an operation unit 209.

The optical unit 202 includes a fly-eye lens 211, a polarization conversion element 212, a condenser lens 213, a dichroic mirror 214, total reflection mirrors 215, relay lenses 216, field lenses 217, three-colored light valves 203 having a liquid crystal panel 218 as a display element, a prism 219, and a projection lens 201.

In the optical unit 202, white light without polarization radiated from the sealed lamp device 100 is converted to a linear polarized light through the fly-eye lens 211 first and the polarization conversion element 212 thereafter. Accordingly, white light free of luminance irregularities is generated after being converged by the condenser lens 213. The white light free of luminance irregularities is emitted to the three light valves 203 via the dichroic mirrors 214.

The white light is separated into red, green, and blue light by the dichroic mirrors 214 that serves as a color separation means. The red light is converged by the field lens 217 and incident on the light valve 203 for red light after passing through the relay lens 216, the total reflection mirror 215, the relay lens 216, and the total reflection mirror 215.

The green light is converged by the field lens 217 after through the dichroic mirror 214 and is incident on the light valve 203 for green light. The blue light is converged by the field lens 217 after through the dichroic mirror 214 first and the total reflection mirror 215 thereafter, and is incident on the light valve 203 for blue light.

Each of the three light valves 203 has a liquid crystal panel 218 having two polarizing plate 221, one at the input side and the other at the output side. Polarization direction of each color light is aligned at the input side polarizing plate 221 and is incident on the liquid crystal panel 218. The liquid crystal panel 218 modulates the each color light by using a video signal applied in correspondence with the each color. The three modulated lights are polarized after passing through the output side polarizing plate 221 and become image lights. The image lights are incident on the prism 219. The image lights are combined at the prism 219, and the combined image light is projected to the screen by the projection lens 201, projecting the full color image.

The sirocco fan 206 is configured to send air for cooling to the sealed lamp device 100, the optical unit 202, and the power circuit unit 230 through the duct 207.

The two sirocco fans 206 are arranged so as to have the projection lens 201 in between. Each of the sirocco fans 206 has intake ports 223, 224 arranged to face the projection lens 201, and send air for cooling to a vicinity of the light valve 203 of the optical unit 202 through thin ducts 225, 226.

As described above, in the present embodiment, the sealed space S which is occupied by the discharge lamp burner 11 is enlarged. Accordingly, the heat radiation property of the sealed lamp device 100 may be improved, and the temperature of the sealed lamp device 100 may be regulated within a predetermined temperature range, thereby allowing an improvement of the emission efficiency and extension of the life of the discharge lamp burner 11.

Furthermore, since the heat radiating property is improved, blower fans such as the sirocco fan 206 and the axial fan 205 can cool the sealed lamp device 100 effectively with smaller amount of airflow than a related art blower fan. Therefore, the fans are allowed to rotate in a lower revolution speed, allowing to largely reduce fan's noise as well as power consumption.

Furthermore, the improvement of the heat radiating property may be realized by the compact, simple and low-cost construction such that the hollow casing structure 20 is simply attached to the lamp unit 10, thereby preventing the projector 200 from increasing in size and cost.

It should be understood by those skilled in the art that various modifications, combinations, sub-combinations and alterations may occur depending on design requirements and other factors insofar as they are within the scope of the appended claims or the equivalents thereof.

For example, in the present embodiment, the hollow casing structure 20 is formed wider than the opening section of the concave mirror 12. Alternatively, the hollow casing structure 20 may be expanded in the optical axis direction of the concave mirror 12 so as to enlarge the volume of the sealed space S of the discharge lamp burner 11.

Furthermore, in the present embodiment, the hollow casing structure 20 is made in a square shape. Alternatively, the shape may be formed an arbitrary form such as a circular form in consideration with fitting to the projector 200.

The invention claimed is:

1. A sealed lamp device comprising:
a discharge lamp burner;
a concave mirror opened to a front direction and reflecting radiation light of the discharge lamp burner to the opened side, an optical axis of the concave mirror being aligned with an optical axis of the discharge lamp burner;
a hollow casing structure having an opening section in a front side, to which the concave mirror opened out; and
a front plate closing the opening section of the hollow casing structure and emitting the radiation light,
wherein the hollow casing structure is made wider than an opening width of the concave mirror,
wherein a flow-guiding plate which guides air convection is disposed inside the hollow casing structure, and
wherein the discharge lamp burner, the concave mirror, the hollow casing structure, and the front plate are arranged such that a sealed space is formed from a portion of the concave mirror opened to the front direction through an inside portion of the hollow casing structure to an inner side portion of the front plate in which the flow-guiding plate and at least a portion of the discharge lamp burner are accommodated in said sealed space.

2. The sealed lamp device according to claim 1, wherein the hollow casing structure is made of highly heat conductive material which radiates inner heat to outside.

3. The sealed lamp device according to claim 2, wherein the hollow casing structure is made of highly heat conductive material containing aluminum, copper or magnesium.

4. The sealed lamp device according to claim 3, wherein the hollow casing structure is subjected to anodizing treatment, coating or a chemical conversion surface treatments so as to prevent rust and decrease thermal reflectance ratio while increasing heat radiation ratio.

5. The sealed lamp device according to one of claims 1, 2, 3 and 4, in which the flow-guiding plate disposed inside of the hollow casing structure guides vertical air convection along an entire inner wall of the hollow casing structure.

6. The sealed lamp device according to claim 5, wherein the flow-guiding plate includes a pair of band plates which are disposed in proximity to both of right and left side walls of the hollow casing structure with a gap in between.

7. The sealed lamp device according to claim 6, further comprising a median plate having a narrower width than that of the band plate and bridging between upper parts of the pair of band plates.

8. A projector comprising:
   a sealed lamp device including
   a discharge lamp burner,
   a concave mirror opened to a front direction and reflecting radiation light of the discharge lamp burner to the opened side, an optical axis of the concave mirror being aligned with an optical axis of the discharge lamp burner,
   a hollow casing structure having an opening section in a front side, to which the concave mirror opened out,
   a front plate closing the opening section of the hollow casing structure and emitting the radiation light, and
   a flow-guiding plate disposed inside of the hollow casing structure and guiding vertical air convection along an entire inner wall of the hollow casing structure,
   wherein the hollow casing structure is made wider than an opening width of the concave mirror, and
   wherein the discharge lamp burner, the concave mirror, the hollow casing structure, and the front plate are arranged such that a sealed space is formed from a portion of the concave mirror opened to the front direction through an inside portion of the hollow casing structure to an inner side portion of the front plate in which the flow-guiding plate and at least a portion of the discharge lamp burner are accommodated in said sealed space;
   a lamp cooling device cooling the discharge lamp burner; and
   an optical unit including a projection lens and a reflecting mirror.

* * * * *